UNITED STATES PATENT OFFICE.

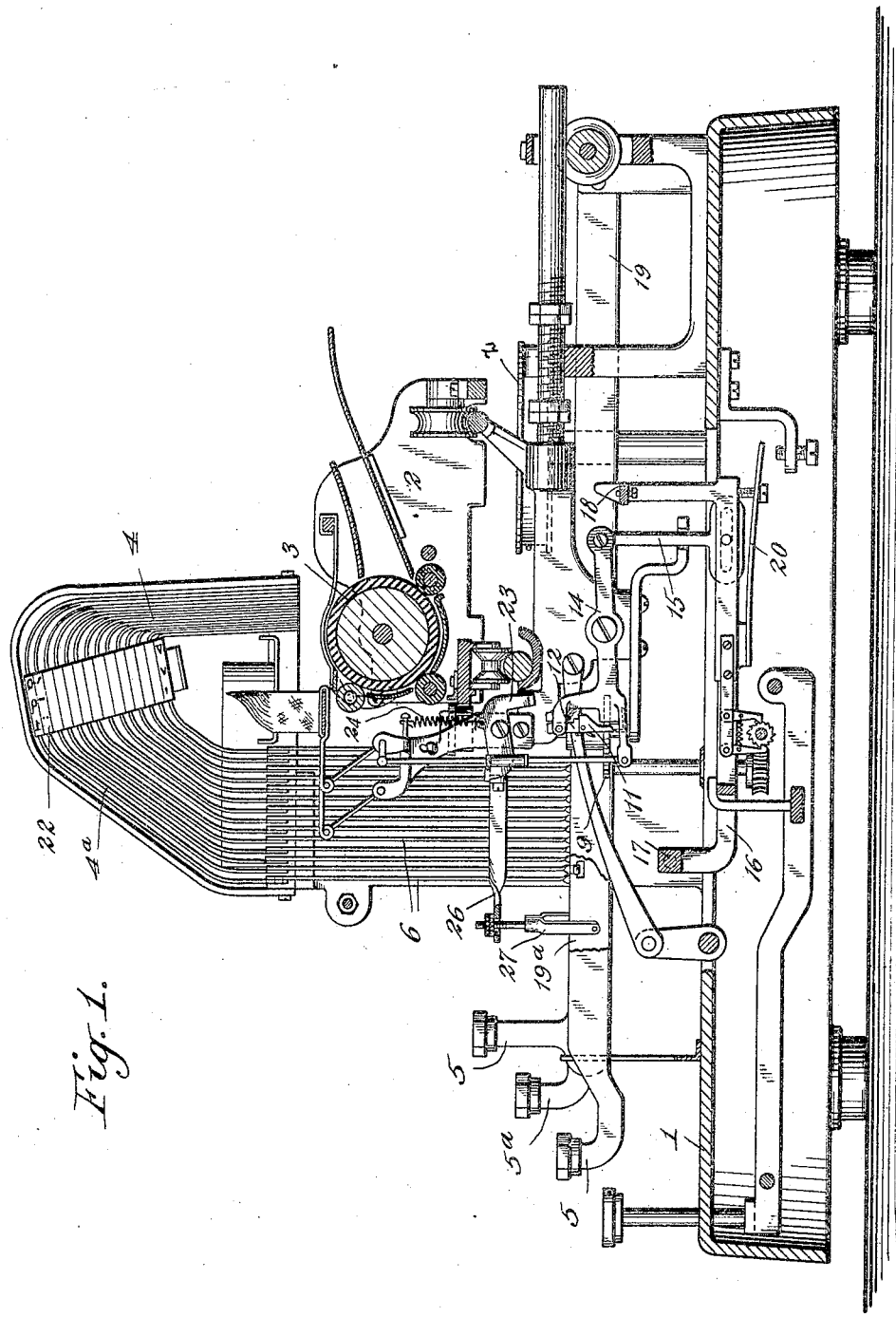

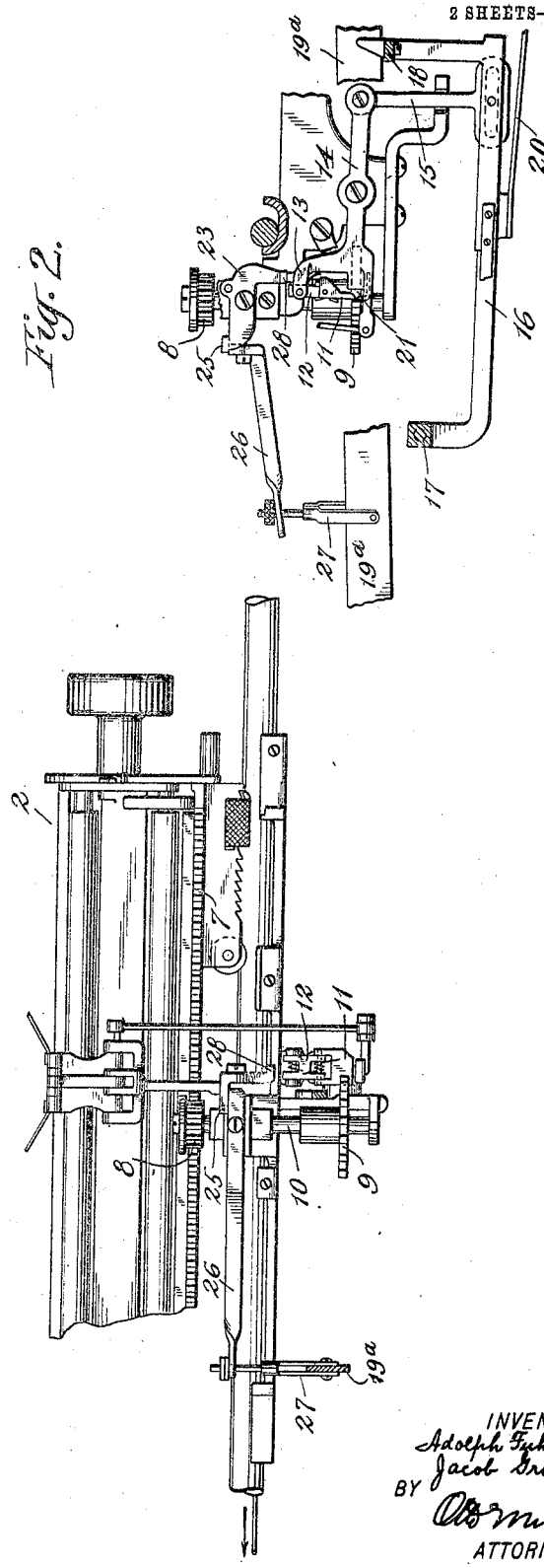

ADOLPH FUHLENDORF AND JACOB GROTHE, OF NEW YORK, N. Y.

TYPE-WRITING MACHINE.

No. 887,083.

Specification of Letters Patent.

Patented May 12, 1908.

Application filed March 26, 1907. Serial No. 364,654.

*To all whom it may concern:*

Be it known that we, ADOLPH FUHLENDORF and JACOB GROTHE, citizens of the United States, residing at New York city, in the county of New York and State of New York, have invented certain new and useful Improvements in Type-Writing Machines, of which the following is a specification.

The present invention relates to typewriting machines and has especial reference to means for preventing a feeding movement of the typewriter carriage after certain predetermined keys (called silent or accent keys) have been operated.

The purpose of the invention is to enable a plurality of characters to be printed in the same vertical alinement and to avoid the necessity of retracting the carriage after the first of these characters has been printed.

The invention is particularly applicable to the Oliver and similar types of typewriting machines, wherein an escapement device coöperates with an escapement rack on the carriage for permitting a feeding movement of the latter.

Stated in general terms, the invention consists in providing mechanism which becomes operative to prevent a feeding movement of the carriage when any predetermined character has been struck. This mechanism includes a member which may be projected into the path of, or into contact with the escapement dog or its equivalent and prevents the release of the latter from the escapement pinion when a silent or accent key has been struck.

As shown in the accompanying drawing, the escapement dog when operated through the medium of our present invention is acted upon by two forces, the one being the action of the universal bar which tends to and does raise the dog to a certain extent, and the other being the member of our improved device which is projected into the path of travel of the dog, and contacts with the same to prevent the latter from completing its travel, and thus from being entirely released from the escapement pinion.

While under ordinary circumstances, two opposing forces operating in this manner would have the effect of preventing action of any kind in the dog, we would point out that this is not the result of our invention, inasmuch as the dog is raised sufficiently to permit the universal bar to operate the ribbon vibrator, and there is an amount of lost motion at the point where the type bars are pivoted to the upright links to permit the type to print even though the escapement dog is stopped in its travel, short of its release from the escapement pinion.

In the accompanying drawings we have illustrated the invention as applied to one of the well-known makes of typewriters, and it will be apparent that the invention may be applied without difficulty to other machines having similar carriage feeding mechanism.

In the drawings: Figure 1 is a vertical longitudinal section through a machine equipped with the device forming the present invention and showing the parts in their normal position before a key is depressed. Fig. 2 is a fragmentary view in the plane of Fig. 1 showing the relation of the parts after the depression of a key to which the device forming the present invention is connected. Fig. 3 is a fragmentary view in front elevation with the parts shown in normal position.

Referring to the drawings, the reference character 1 designates the main frame of the machine and 2 designates the carriage. The platen 3 is mounted on the carriage in the usual way and typebars 4 are mounted above the carriage in a bank.

The type keys are designated 5 and the links connecting the keys and type bars are designated 6. The carriage is advanced by the usual spring (not shown) held in the spring drum Z and its advance is controlled by a rotary escapement mechanism of well-known design. This escapement mechanism comprises a rack 7 mounted on the carriage, a pinion 8 engaging the rack, a second pinion 9 mounted on a shaft 10 which carries the pinion 8, and a dog 11 which coöperates with the pinion 9. The dog 11 is hinged at the lower end of a hanger 12 and both the hanger and the dog are provided with springs, as best shown in Fig. 3. The hanger 12 is pivoted in a bracket or arm 13 carried by a lever 14 which is connected by a link 15 with a frame 16 pivoted at 17 and presenting at the rear the universal bar 18 just above which all the key levers 19 are supported. The frame 16 is supported by a spring 20 and the lever 14 is normally held in the position shown in Fig. 1, the dog 11 extending between two of the teeth on the pinion 9. The tension of the spring or other agency used to advance the carriage tends to rotate the pinion 8 through the engagement of that pinion with the rack 7 on the carriage and this rotating tendency is imparted through the shaft 10 to the pinion 9. As long, however, as the dog 11 extends between the teeth of the pinion 9 no turning movement of that pinion can take place and the carriage will be held stationary. When, however, one of the keys 5 is depressed the corresponding key lever 19 depresses the universal bar 18 and the frame 16 upon which it is mounted. This depression of the frame 16 rocks the lever 14 and raises the dog 11. The upward movement of the dog 11 is sufficient, if not impeded, to cause it to clear the pinion 9, which turns until the tooth previously engaged by the dog 11 strikes against a shoulder 21 formed on the lever 13 behind and below the dog 11. When the dog 11 clears the pinion 9 and the pinion is partially turned, as stated, the springs with which the dog 11 and hanger 9 are provided act to advance the dog beyond the tooth on the pinion 9 previously engaged by the dog. So, when pressure is removed from the type key and the lever 14 returns to the normal position shown in Fig. 1 the dog 11 engages with the next tooth on the pinion 9. Such tooth on the pinion 9 corresponds to a single character space, the carriage of the machine is automatically advanced a single space after each printing operation, if the dog 11 is allowed to clear the escapement pinion 9 when the type key is depressed.

At 22 we have illustrated a type bar bearing three characters which are never printed in the same horizontal line with the letters, namely two accent marks and an underscore. These characters are always written either above or below some other character in the line. Consequently it is desirable that the key 5ᵃ which actuates the type-bar 4ᵃ carrying these characters should be associated with some device for preventing the advance of the carriage after a printing movement of that type bar. To accomplish this end, we provide a small bell-crank lever 23 which is so mounted that it normally occupies the position shown in Fig. 1, being held in that position by means of a spring 24. At its forward extremity the bell-crank 23 is provided with a lug 25 which rests upon the short arm of a bent lever 26, the long arm of which is connected by means of a stirrup 27 with the lever 19ᵃ bearing the key 5ᵃ. When the key 5ᵃ is depressed the bent lever 26 is moved into the position shown in Fig. 2 and the bell-crank lever 23 is rocked against the tension of spring 24 into such position that a lug 28 on the descending arm of the bell-crank is brought over a boss on the bracket or arm 13 which carries the hanger 12 and dog 11. The lug 28 on the bell-crank acts as a stop to arrest the upward movement of the bracket or arm 13 and prevents the dog 11 from clearing the pinion 9. Consequently, after the printing movement of the type bar 4ᵃ the lever 14 returns to its normal position without any disengagement of the dog 11 and pinion 9, thus preventing any advance of the carriage after the printing operation and permitting another character to be printed before the carriage advances.

While we have shown the lever 26 connected with the key corresponding to certain characters, it is obvious that the lever 26 may be connected with other keys if it is desired to prevent movement of the carriage after printing the characters controlled thereby; and it is also obvious that the key 5ᵃ to which the lever 26 is connected may not be associated with any type bar, but may be depressed simultaneously with any key upon the key board of the machine, if so desired. If it is desired to permit the carriage to be fed forward after the key 5ᵃ is depressed, this purpose may be accomplished by simply freeing the stirrup 27 from this key, thus causing the dog 11 to operate in its normal manner, without interference from the attachment herein described.

Having thus described our invention, what we claim as new and desire to secure by Letters Patent is:

1. In a typewriting machine of the character described, the combination with type levers, of a universal bar operable thereby, a carriage provided with an escapement rack, an escapement pinion in mesh with the rack, an escapement dog normally designed to permit a feeding movement of the carriage upon operation of the universal bar, and means to prevent a feeding movement of the carriage upon the operation of certain type levers, said means comprising a bell crank lever having an extension designed to be projected into the path of the dog and permit but partial actuation thereof when a predetermined type lever is operated.

2. In a typewriting machine of the character described, the combination with type levers, of a universal bar operable thereby, a carriage provided with an escapement rack, an escapement pinion in mesh with the rack, a second escapement pinion normally in engagement with an escapement dog which is designed when disengaged from the pinion to permit a feeding movement of the carriage, and means operable upon depression of predetermined type levers to prevent complete disengagement of the escapement dog from its pinion, said means comprising a bell crank lever pivoted over the escapement dog, and having an extension which is adapted to be depressed into contact with the dog upon operation of predetermined type levers.

3. In a typewriting machine of the character described, the combination with type levers, of a universal bar operable thereby, a carriage provided with an escapement rack, escapement mechanism coöperating with said escapement rack, an escapement dog normally engaging the escapement mechanism and operable by the universal bar to release the same from the escapement mechanism and permit a feeding movement of the carriage, and means to prevent a feeding movement of the carriage upon operation of the universal bar by predetermined type levers, said means comprising a bell crank lever having an extension projecting over the escapement dog, and a link extending from the bell crank lever to a type lever, whereby when the latter is depressed to operate the universal bar the bell crank lever is rocked and caused to project its extension over the escapement dog and prevent disengagement of the latter from the escapement mechanism.

4. In a typewriting machine of the character described, the combination with type levers, of a universal bar operable thereby, a carriage, escapement mechanism, an escapement dog normally in engagement with the escapement mechanism and operable by the universal bar to be released from the escapement mechanism to permit a feeding movement of the carriage, and means operable upon the depression of predetermined type levers to prevent a feeding movement of the carriage when the universal bar is operated by the said type levers and itself operates the escapement dog, said means comprising a pivoted bell crank lever having an extension lying over the escapement dog, a spring for normally holding the lever out of contact with the dog, and a link connection extending from the bell crank lever to a predetermined type lever by means of which the bell crank lever, upon depression of the type lever, may be rocked into contact with the escapement dog.

5. In a typewriting machine of the character described, the combination with type levers, of a universal bar operable thereby, a carriage, escapement mechanism, an escapement dog normally in engagement with the escapement mechanism and operable by the universal bar to be released from the escapement mechanism to permit a feeding movement of the carriage, and means operable upon depression of predetermined type levers to prevent a feeding movement of the carriage when the universal bar is operated by the said type levers and itself operates the escapement dog, said means comprising a pivoted bell crank lever having an extension lying over the escapement dog, a spring for normally holding the lever out of contact with the dog, a link connected to said bell crank lever, and a stirrup connected to said link and to one of said type levers, whereby upon depression of the latter the bell crank lever may be rocked into contact with the escapement dog.

In testimony whereof we have affixed our signatures in presence of two witnesses.

ADOLPH FUHLENDORF.
JACOB GROTHE.

Witnesses:
CLARISSA FRANCH,
BLANCHE GALLAGHER.